United States Patent [19]

Ahn et al.

[11] Patent Number: 5,784,364
[45] Date of Patent: Jul. 21, 1998

[54] MULTIPLE PATH DELAY TIME SEARCHER IN REVERSE LINK COMMUNICATION CHANNEL OF A COMMUNICATION SYSTEM EMPLOYING A CODE DIVISION MULTIPLE ACCESS METHOD

[75] Inventors: Jae-Min Ahn; Young-Ky Kim; Chun-Young Seo, all of Seoul, Rep. of Korea

[73] Assignee: Samsung Electronics Co., Ltd., Suwon, Rep. of Korea

[21] Appl. No.: 668,237

[22] Filed: Jun. 21, 1996

[30] Foreign Application Priority Data

Jun. 23, 1995 [KR] Rep. of Korea ............ 1995-17098

[51] Int. Cl.$^6$ .................................................. H04B 7/216
[52] U.S. Cl. ............................................... 370/335; 375/200
[58] Field of Search ................................ 370/209, 320, 370/342, 335, 441, 491; 375/200, 206, 208, 326, 354, 349, 347, 362, 335

[56] References Cited

U.S. PATENT DOCUMENTS

| | | | |
|---|---|---|---|
| 5,109,390 | 4/1992 | Gilhousen et al. | 370/335 |
| 5,237,586 | 8/1993 | Bottomley | 370/209 |
| 5,237,587 | 8/1993 | Schoolcraft | 375/208 |
| 5,253,268 | 10/1993 | Omura et al. | 375/200 |
| 5,305,349 | 4/1994 | Dent | 370/209 |
| 5,315,615 | 5/1994 | DeLisle et al. | 375/206 |

*Primary Examiner*—Chau Nguyen
*Attorney, Agent, or Firm*—Dilworth & Barrese

[57] ABSTRACT

A multiple path delay time searcher at a signal demodulation mode of a reverse link communication channel of a mobile communication system employing a code division multiple access method. The multiple path delay time searcher includes a sample buffer for storing a signal received from an antenna of a base station as a sample; a delay time searcher for obtaining a correlation value between a signal at a specific search location designated by the sample buffer and a reference signal corresponding to a specific symbol; a signal processor for deciding whether there is a signal component in the specific search location using an accumulative average of the correlation values received from the delay time searcher; and a multiple path combiner for deciding the symbol designated in the delay time searcher.

4 Claims, 1 Drawing Sheet

MULTIPLE PATH DELAY TIME SEARCHER IN REVERSE LINK COMMUNICATION CHANNEL OF A COMMUNICATION SYSTEM EMPLOYING A CODE DIVISION MULTIPLE ACCESS METHOD

BACKGROUND OF THE INVENTION

1. Field of the Invention

The present invention relates to a delay time searcher for a transmission signal from a mobile station to be received at a base station by being delayed by multiple path radio channels of a reverse link communication channel of a mobile communication system employing code division multiple access.

A delay time searcher according to the present invention is based on Korean Application No. 17098/1995 which is incorporated herein by reference.

2. Description of the Related Art

According to the prior art, a multiple path delay time may be searched in a communication channel in a communication system by designating, through a processor, a specific search location and a specific delay time of a searching window on a delay time axis. The processor searches for transmission signals from mobile stations which are delayed by a multiple path radio channel associated with a specific search location on the delay time axis at the signal demodulation mode of a reverse link communication channel.

FIG. 1 is a block diagram of a multiple path delay time searcher according to the prior art. As shown in FIG. 1, a communication system includes a delay time searcher 3 and a signal processor 5 which provides delay time designation data 7 to the delay time searcher 3 and which processes a signal outputted from the delay time searcher 3. An illustrative example of the operation of the multiple path delay time searcher is described below.

The delay time designation data 7 outputted from the signal processor 5 is inputted to the delay time searcher 3. The delay time searcher 3 extracts correlation values of a signal input 1 with respect to reference signals and then provides the extracted values to the signal processor 5. The signal input 1 is inputted from the base station within the designated delay time 7 with the reference signals corresponding to each of a set of transmittable symbols from the mobile station. The signal processor 5 adds the correlation values outputted from the delay time searcher 3 to generate an average value of such correlation values. Thereafter, the signal processor 5 compares the average value with a preset maximum threshold correlation value. According to the result of the comparison, the signal processor 5 detects whether there is the mobile station transmission signal delayed by the multiple path radio channel in the specific search location.

However, according to such a method, in checking for the presence or absence of the signal delayed by the multiple path radio channel in the specific search location on the delay time axis, there may be a relatively high probability of false detections in the same signal to noise ratio.

In a first case, in which a signal is delayed in the specific search location, an unacceptably low correlation value is obtained from the reference signals, corresponding to each of a set of transmittable symbols from the mobile station, and from the reception signals from the base station. An ideal correlation value of one occurs when the signal received from the base station coincides with the signal transmitted from the mobile station; that is, the signals are synchronized. In a second case, when there is no signal delayed in the specific search location, even if a reception signal coincides with the reference signal, it is anticipated that the correlation value may be small, based on a fact that there is no synchronization of signals; that is, the signals do not coincide with one another. In addition, even when the transmission signal from the mobile station and the reception signal from the base station do not coincide with one another, the obtained correlation value will be small. Accordingly, in the second case, if a maximum value of the obtained correlation values is selected, the dominant correlation values obtained correspond to a noise component, regardless of the size of the signal component. The correlation values exceeding the threshold are determined by large values ranging in size corresponding to the correlation values of the reference signal and the noise signal. Further, it is anticipated that as the correlation values of the transmission signal from the mobile station with respect to the reference signals become large enough, as compared with the correlation values obtained of the reception signal from the base station and the reference signal, the transmission signal from the mobile station would be accurately detected.

In other words, even though there is no signal delayed by the specific search location, if the delay signal component is searched according to methods in the prior art, there may be a high probability of erroneously deciding that there is the delay signal component in the specific reference value to be compared therewith. With such a high probability of error in the decision process, the receiver of the base station experiences a reduction in its receiving performance, which hinders the operating capacity of the mobile communication system employing code division multiple access.

SUMMARY OF THE INVENTION

It is therefore, an object of the invention to provide a circuit capable of improving the overall function of a mobile communication system employing a code division multiple access method by reducing the probability of error in deciding whether or not there is any signal delayed by a multiple path channel in a specific search location on a delay time axis.

It is another object of the invention to provide a delay time searcher which reduces the probability of erroneous decisions generated by obtaining a maximum value of correlation values, by searching for a transmission symbol from a mobile station and then by obtaining a correlation value with respect to a reference signal corresponding to the transmission symbol and a reception signal from a base station.

In order to achieve the objects of the present invention, a multiple path delay time searcher at a signal demodulation mode of a reverse link communication channel of a mobile communication system employing a code division multiple access method comprises a sample buffer for storing a signal received from an antenna of a base station as a sample form; a delay time searcher for obtaining through a signal processor a correlation value between a signal at a specific search location designated by the sample buffer and a reference signal corresponding to a specific symbol and the specific search location. The signal processor decides whether there is a signal component in the specific search location using an accumulative average of the correlation values received from the delay time searcher; and a multiple path combiner is included for deciding which symbol to be designated in the delay time searcher.

BRIEF DESCRIPTION OF THE DRAWINGS

The above and other objects, advantages and features of the present invention will be more apparent from the following detailed description considered with the attached drawings in which.

DETAILED DESCRIPTION OF PREFERRED EMBODIMENTS

Figure 1:
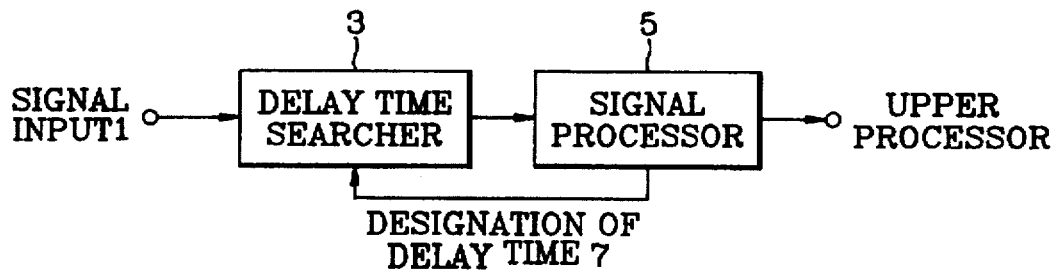
FIG. 1 is a block diagram of a multiple path delay time searcher according to the prior art.
Figure 2:
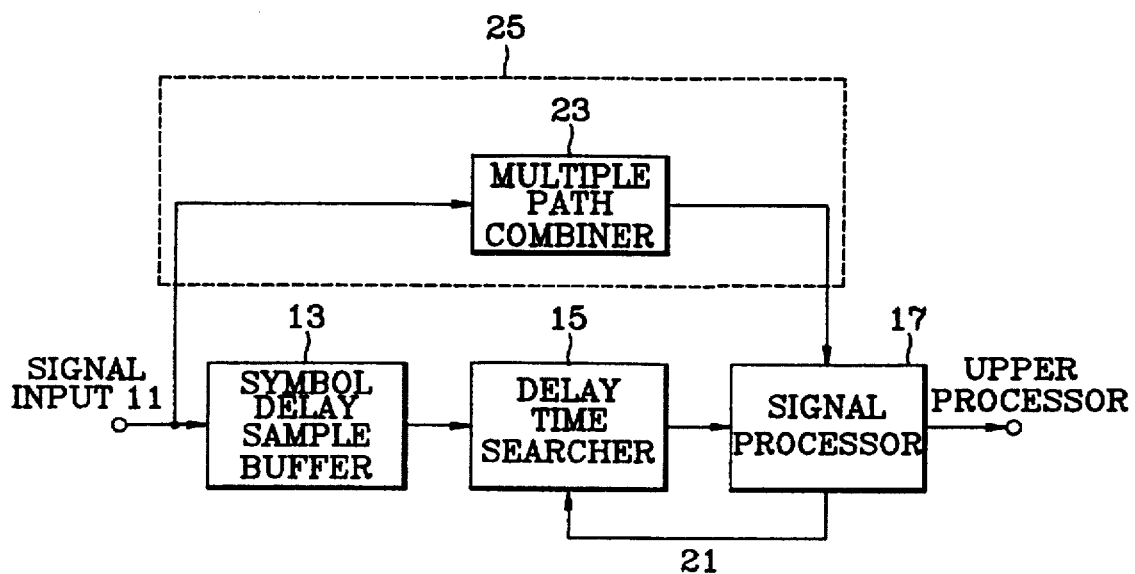
FIG. 2 is a block diagram of a multiple path delay time searcher according to the present invention.

FIG. 2 is a block diagram of a multiple path delay time searcher according to the present invention. As shown in FIG. 2, the communication system includes a sample buffer 13, a delay time searcher 15, a multiple path combiner 23, and a signal processor 17. The sample buffer 13 stores, as a digital signal, a signal input 11 received from an antenna of a base station. The delay time searcher 15 obtains a correlation value of the signal input 11 with respect to a specific reference signal in a specific search location on a delay time axis by using the signal of the sample buffer 13. The multiple path combiner 23 determines which symbol of the signal input 11 to be currently received from the base station is used to correlate with the specific reference signal. The signal processor 17 designates both the result of the symbol decision of the multiple path combiner 23 and the specific delay time within a searching window, and feeds back the designated result to the delay time searcher 15 through a feed-back path 21 to thereby judge the presence or absence of the signal in the specific search location designated according to the correlation value output from the delay time searcher 15.

In an illustrative operation of the preferred embodiment according to the present invention, the multiple path combiner 23 determines the symbol of the input signal, and provides the determined input symbol to the delay time searcher 15 through the feed-back path 21 and through the signal processor 17.

The signal processor 17 provides the specific search location to be searched in the delay time searcher 15, in addition to the determined symbol, to the delay time searcher 15 through the feed-back path 21. The delay time searcher 15 obtains the correlation value between the reference signal corresponding to the symbol indicated by the signal processor 17 and the signal input 11 at the specific location of the sample buffer 13, and then outputs the obtained correlation value to the signal processor 17. The signal processor 17 accumulatively averages the correlation values output from the delay time searcher 15 with relation to a corresponding delay time and compares the maximum correlation value with a predetermined threshold correlation value to thereby judge the presence or absence of the signal at the specific delay time. The multiple path combiner 23 determines the symbol of the currently inputted signal concurrently with the operation of the delay time searcher 15, while the correlation values are obtained in the delay time searcher 15.

As mentioned above, according to the method of deciding whether or not there is the reception signal in the specific search location within the searching window on the delay time axis by taking the maximum value among the correlation values of the delay time searcher, there may frequently arise a problem in that there is a high probability of erroneously deciding the presence of any signal even under such a situation that the reception signal is absent. However, the present invention judges the presence or absence of the signal and avoids the difficulties of the prior art by taking the correlation value between the reception signal and the specific reference signal corresponding to the specific symbol the sample buffer which substantially reduces or even eliminates such probability of erroneous decisions.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A multiple path delay time searcher at a signal demodulation mode of a reverse link communication channel of a mobile communication system employing code division multiple access, comprising:

a sample buffer for storing a sample signal received from an antenna of a base station;

a delay time searcher for obtaining a correlation value between the sample signal at a specific search location on a delay time axis designated by said sample buffer and a reference signal corresponding to a designated symbol;

a signal processor for deciding whether there is a signal component in said specific search location using an accumulative average of obtained correlation values received from said delay time searcher; and a multiple path combiner for deciding the symbol designated in said delay time searcher.

2. A multiple path delay time searcher at a signal demodulation mode of a reverse link communication channel of a mobile communication system employing code division multiple access, comprising:

sample means for storing a sample signal received from an antenna;

searching means for obtaining a correlation valve between said sample signal and a reference signal corresponding to a designated symbol;

processing means for determining the presence of a signal component in said sample signal using an accumulative average of obtained correlation valves; and combining means for deciding the symbol designated in said searching means.

3. The multiple path delay time searcher according to claim 2, wherein said sample signal is stored as a specific search location on a delay time axis designated by said sample means.

4. The multiple path delay time search according to claim 2, wherein said combining means comprises a multiple path combiner.

* * * * *